United States Patent [19]

Fier, Jr.

[11] 3,930,467
[45] Jan. 6, 1976

[54] POULTRY COOP
[75] Inventor: Edward J. Fier, Jr., Mundelein, Ill.
[73] Assignee: Norwesco, Inc., St. Paul, Minn.
[22] Filed: Mar. 18, 1974
[21] Appl. No.: 451,933

[52] U.S. Cl. .................................. 119/19; 220/4 B
[51] Int. Cl.² ........................................ A01K 31/18
[58] Field of Search ............. 119/19, 15, 17, 18, 21, 119/22; 220/4 R, 4 B, 4 E, 31 R, 31 S; 206/509, 511

[56] References Cited
UNITED STATES PATENTS

| 3,330,434 | 7/1967 | Bromley | 220/4 B |
|---|---|---|---|
| 3,407,961 | 10/1968 | Box | 220/4 E |
| 3,687,330 | 8/1972 | Herolzer | 119/19 X |
| 3,696,966 | 10/1972 | Herolzer | 206/509 |
| 3,754,676 | 8/1973 | Box | 119/19 X |

Primary Examiner—J. N. Eskovitz
Attorney, Agent, or Firm—Lew Schwartz; Wayne A. Sivertson

[57] ABSTRACT

A stackable poultry coop formed of complementary upper and lower sections and a door. The upper section has an upper wall with a central opening bounded by a plurality of upwardly extending flanges. The lower section has a lower wall formed of a flexible grid and a plurality of downwardly extending ribs adapted to engage and nest with the flanges of another coop when in stacking relation thereto. The lower wall ribs are positioned around the periphery of the lower wall to allow at least its central portion to flex and each of the upper and lower walls have a marginal wall extending generally at right angles from their periphery. The upper, lower and marginal walls are provided with a plurality of openings to provide ventilation as well as to facilitate cleaning.

3 Claims, 19 Drawing Figures

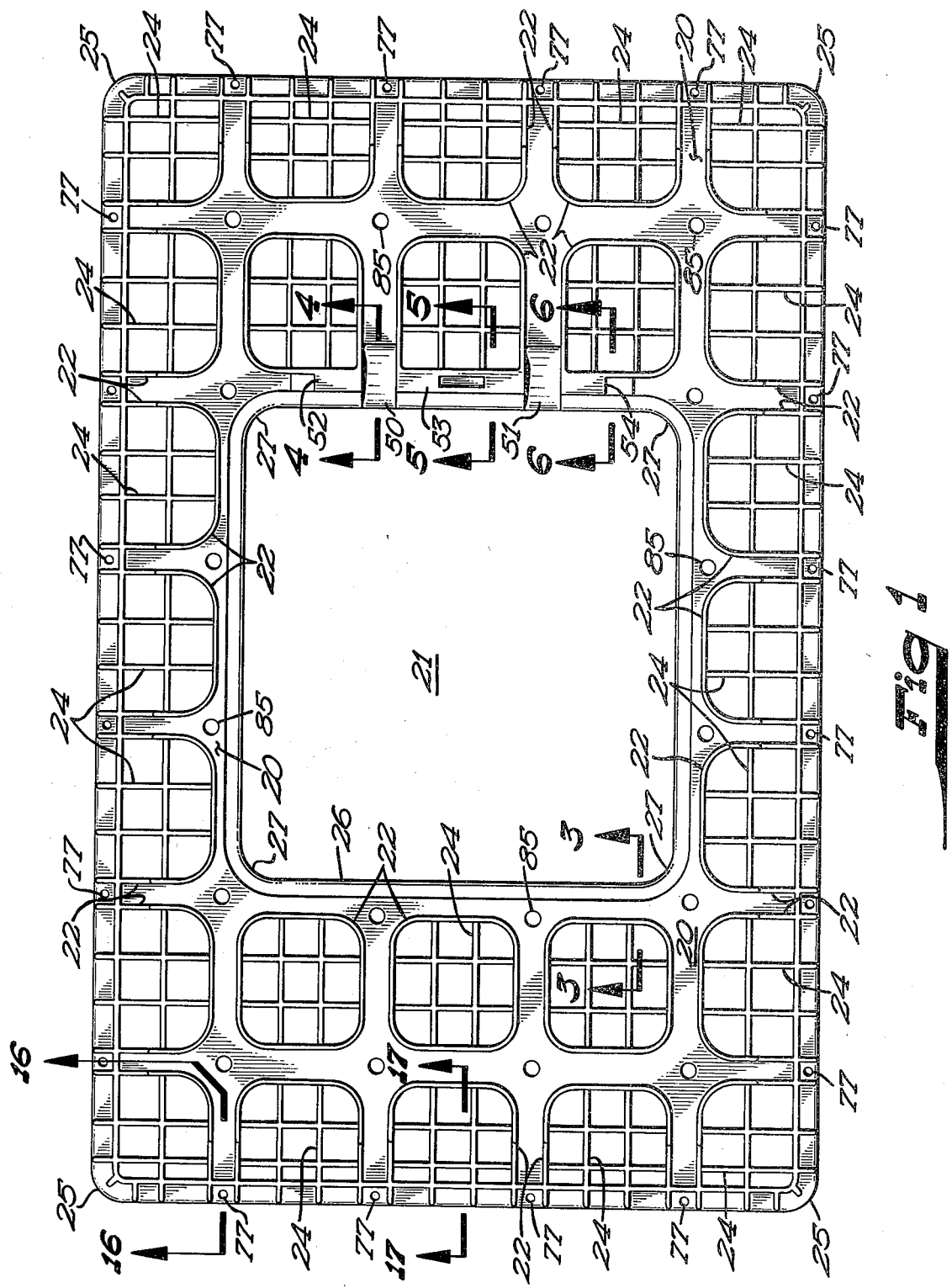

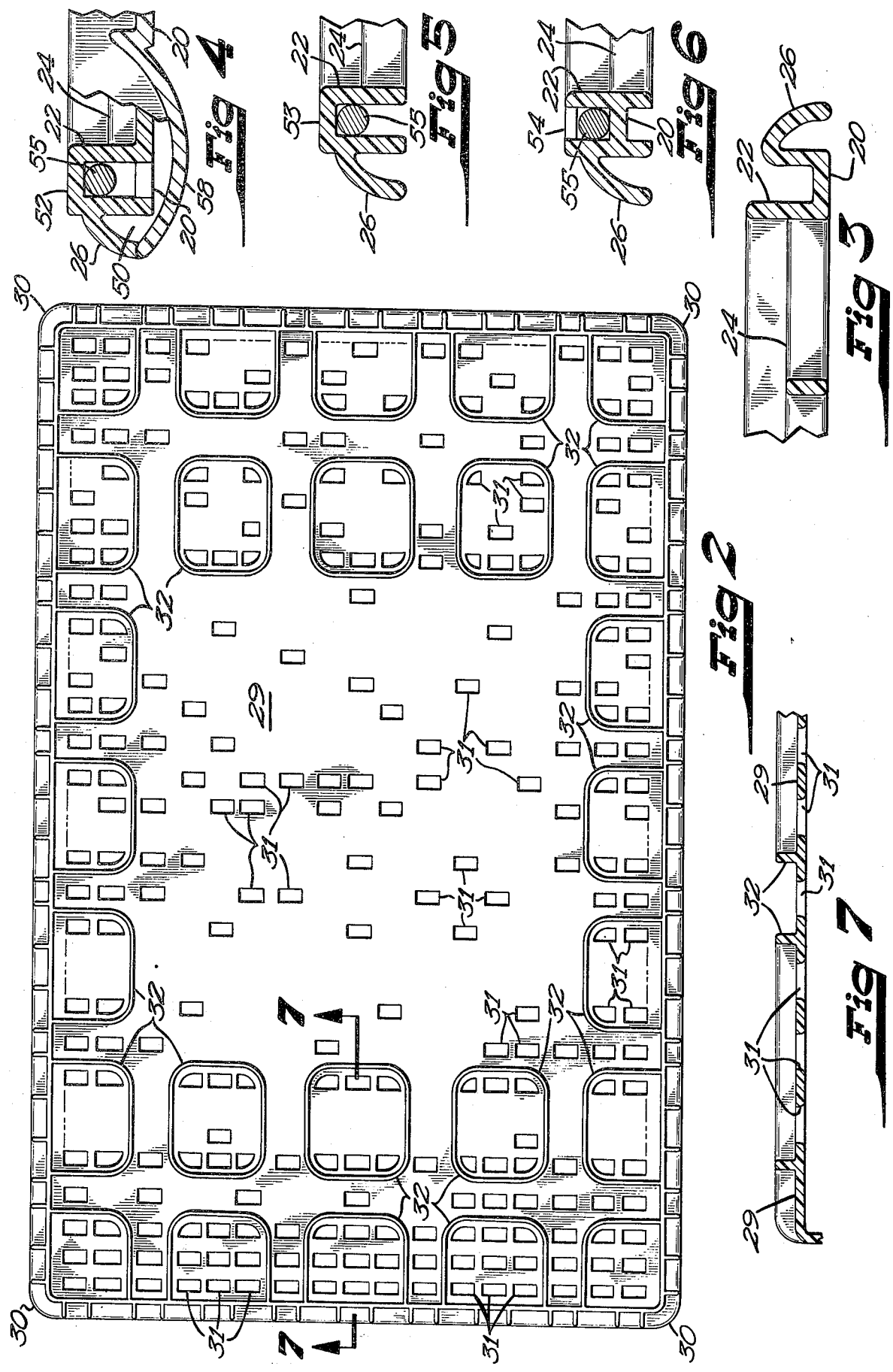

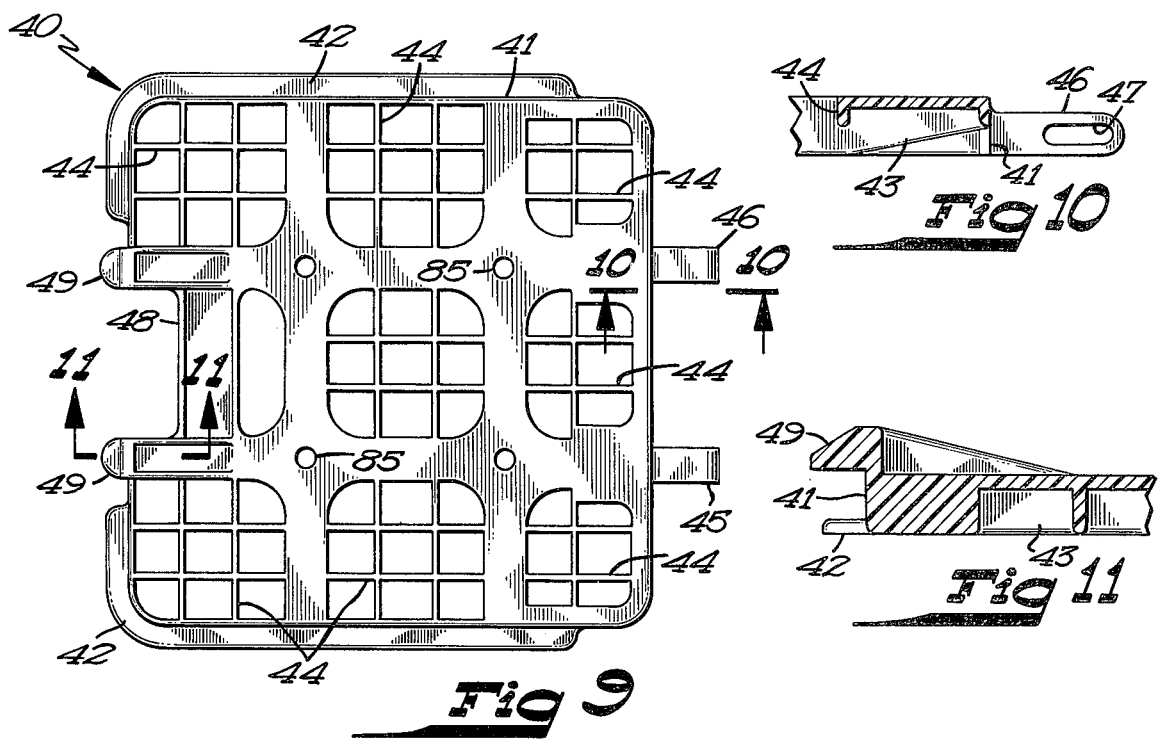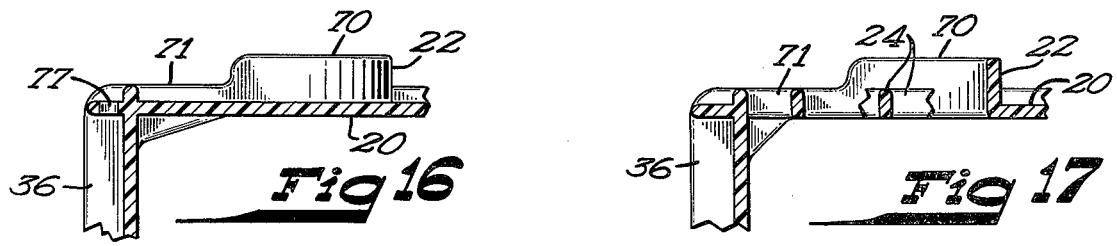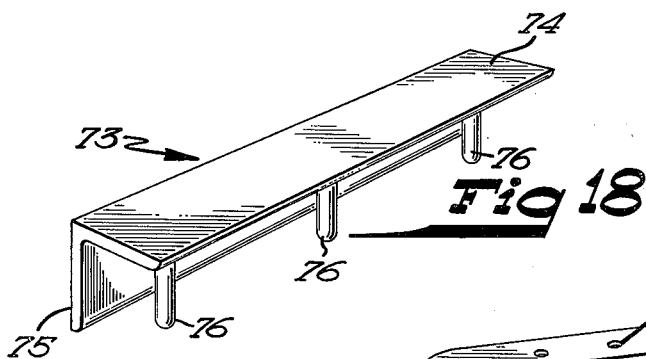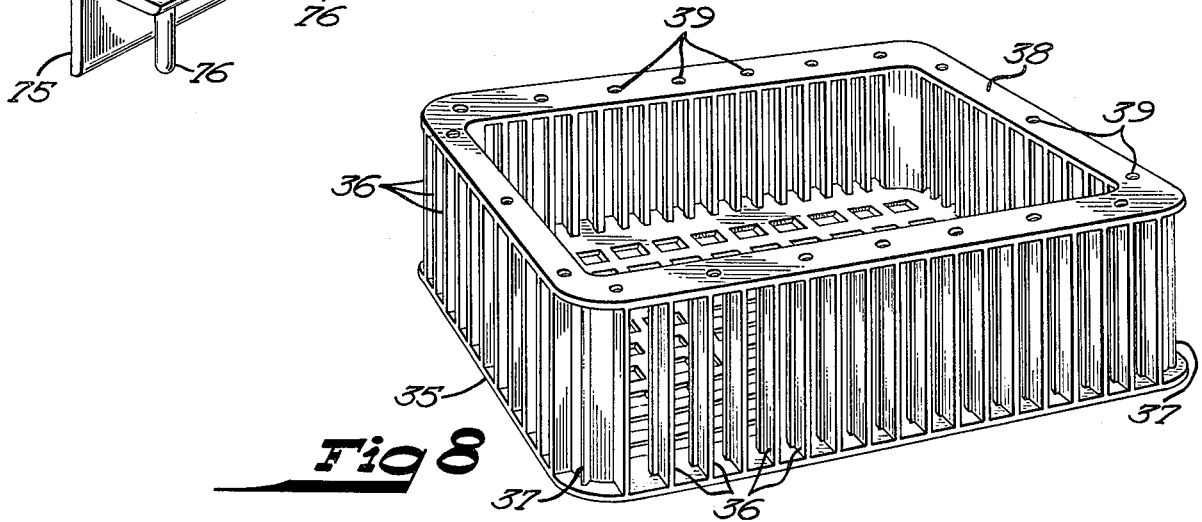

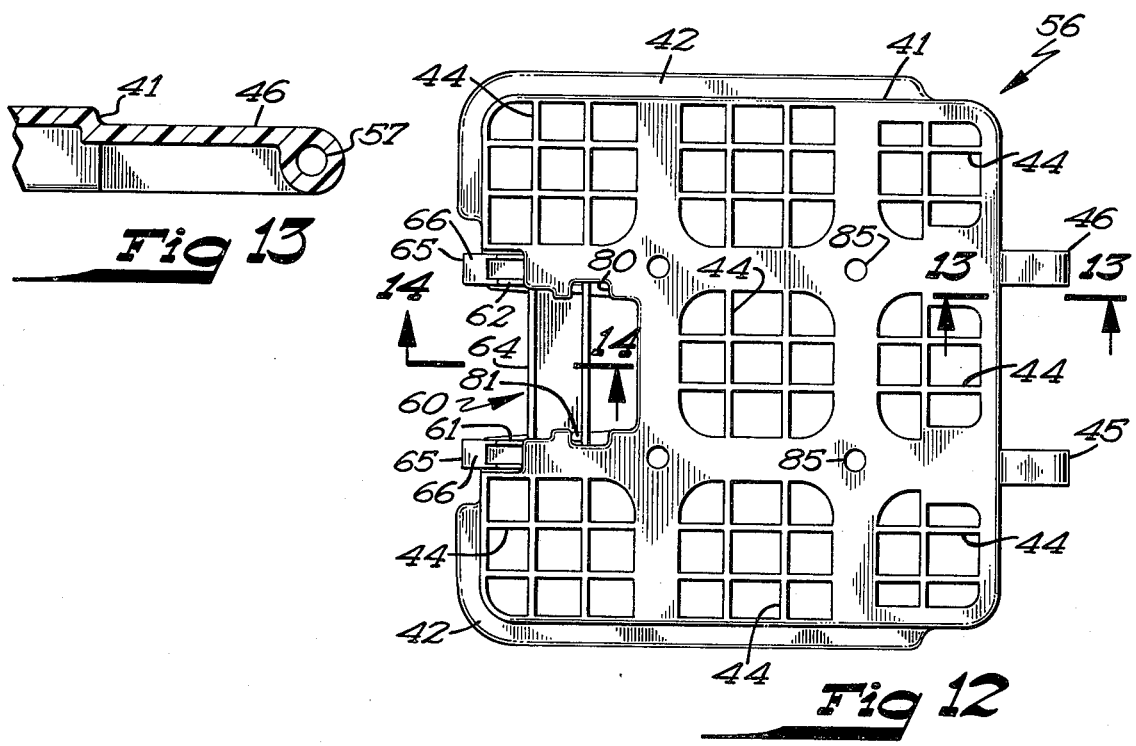
Fig 13
Fig 12
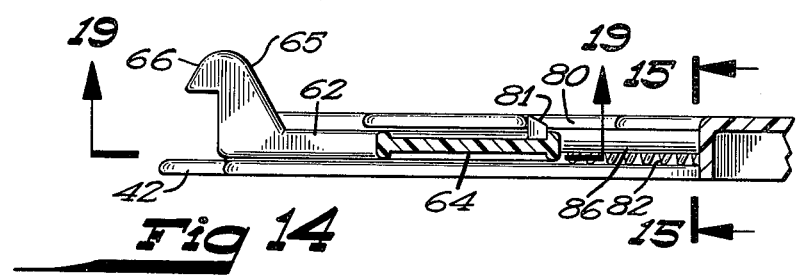
Fig 14
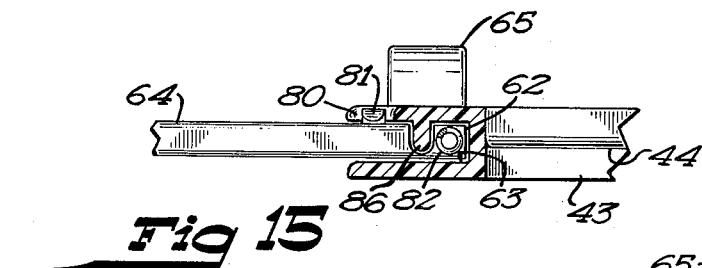
Fig 15
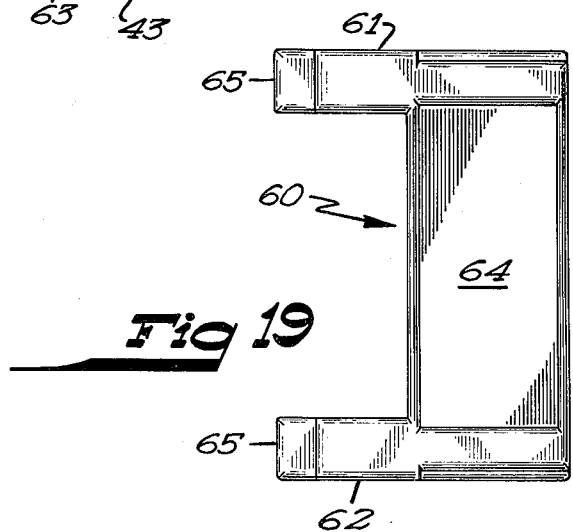
Fig 19

POULTRY COOP

BACKGROUND OF THE INVENTION

Reusable and stackable containers for poultry shipping and the like are known to the prior art. Typical of such prior art poultry coops are those assembled from upper and lower sections and a door all molded from plastic, polyethylene, for example. With the exception of the door opening, the upper and lower sections are of generally identical construction with the top and bottom walls often being ribbed or corrugated for strength. The side or marginal walls are often constructed to provide ventilation with additional ventilation being provided by holes in the top and bottom walls.

In U.S. Pat. No. 3,330,434 there is described a molded plastic shipping container for live foul consisting essentially of upper and lower sections and a door. Each of the upper and lower sections have a generally rectangular wall with a side or marginal wall extending from its periphery. The marginal wall is directed slightly outward and is provided with a rim at its end for the attachment of one section to another. The section intended as the upper section is provided with an opening which may be covered by a door hingedly attached to the wall of the upper section. The side or marginal walls of the upper and lower sections have spaced openings for ventilation and the main walls of the upper and lower sections are also provided with holes to enhance ventilation.

Among the difficulties encountered with prior art poultry coops such as that illustrated in U.S. Pat. No. 3,330,434 is the inflexibility of the floor (i.e., the main wall of the lower section). The poultry which are transported in poultry coops with such rigid floors frequently develop breast blisters. Also, the screw connection between the door hinge and the main wall of the upper section often results in the failure of that connection after repeated openings of the door. Further, the outward extention of the marginal or side walls reduces their weight carrying ability which restricts the stackability of the poultry coops.

SUMMARY OF THE PRESENT INVENTION

The present invention provides a poultry coop assembled from upper and lower sections and a door. The marginal or side walls of the upper and lower sections are generally perpendicular to the main wall of these sections. The main wall of the upper section is reinforced by a plurality of upwardly extending flanges which are positioned around a door opening. A plurality of ribs extend downwardly from the main wall of the lower section to engage the flanges of an upper section to prevent horizontal motion between stacked poultry coops. However, the main wall of the lower section is flexible and the ribs are positioned around its periphery so as to maintain its flexibility at least within the central region. In this manner, the incidence of breast blisters is significantly reduced.

Ventilation of the poultry coop of the present invention is enhanced by forming the flanges of the upper section into closed figures with generally open centers. The open center provides a significantly increased ventilation opening size over that illustrated in U.S. Pat. No. 3,330,434 while a lattice in the open center prevents poultry egress. Also, the side or marginal walls of the upper and lower sections are formed of spaced pillars for better ventilation.

For additional supporting strength, one of the marginal wall pillars is positioned at each corner of the upper and lower section main wall and the space between it and the immediately adjacent pillars is closed. For greater reliability, the door is hingedly attached to the main wall of the upper section by means of bosses molded within that main wall. The pillar spacing and grid configuration of the main wall of the lower section greatly facilitate cleaning of the poultry coop.

The many objects, advantages and novel features of the present invention will become apparent from the following detailed description when considered in conjunction with the drawings.

BRIEF DESCRIPTION OF THE DRAWINGS

FIG. 1 is a top view of the poultry coop of the present invention.

FIG. 2 is a bottom view of the poultry coop of the present invention.

FIG. 3 is a cross-section taken along the line 3—3 in FIG. 1.

FIG. 4 is a cross-section and partial breakaway taken along the line 4—4 in FIG. 1.

FIG. 5 is a cross-section taken along the line 5—5 in FIG. 1.

FIG. 6 is a cross-section taken along the line 6—6 in FIG. 1.

FIG. 7 is a cross-section taken along the line 7—7 in FIG. 2.

FIG. 8 is a perspective view showing a marginal or side wall construction of both the upper and lower section of the present invention.

FIG. 9 is a bottom view of a preferred embodiment of a door suitable for use in conjunction with the preferred embodiment of FIGS. 1–8.

FIG. 10 is a cross-section taken along the line 10—10 in FIG. 9.

FIG. 11 is a cross-section taken along the line 11—11 in FIG. 9.

FIG. 12 is a bottom view of another preferred embodiment of a door suitable for use in the preferred embodiment of FIGS. 1–8.

FIG. 13 is a cross-section taken along the line 13—13 in FIG. 12.

FIG. 14 is a cross-section taken along the line 14—14 in FIG. 12.

FIG. 15 is a cross-section taken along the line 15—15 in FIG. 12.

FIG. 16 is a cross-section taken along the line 16—16 in FIG. 1.

FIG. 17 is a cross-section taken along the line 17—17 in FIG. 1.

FIG. 18 illustrates a preferred embodiment of a portion of the present invention.

FIG. 19 is an illustration of a portion of the preferred embodiment of FIG. 12 as seen along the line 19—19 in FIG. 12.

DETAILED DESCRIPTION OF THE DRAWINGS

The poultry coop of the present invention is formed of upper and lower sections each having marginal or side walls. The marginal walls are connected at their ends to form a poultry coop having an opening on its upper surface which is the main wall of the upper section. FIG. 1 shows a top view of the poultry coop of the present invention.

In FIG. 1, there is illustrated an upper wall 20 having a central opening 21. Surrounding the central opening 21 are a plurality of flanges 22 which form closed figures with themselves or the edges of the upper wall 20. The closed figures formed by the flanges 22 have open centers for ventilation, the openings being provided with lattices 24 to prevent poultry egress. The upper wall 20 is generally polygonal, rectangular in FIG. 1, and is provided with rounded corners as at 25.

The central opening 21 in the upper wall 20 is provided with a radius 26 and rounded corners 27. The radius 26 protects the poultry as it is being loaded into the poultry coop and is illustrated, along with the flanges 22, in FIG. 3 which is a cross-section along the line 3—3 in FIG. 1.

The flanges 22, and particularly the flanges which form closed figures with the edge of the upper wall 20, are further illustrated in FIG. 16 which is a cross-section along the line 16-16 in FIG. 1. The edge flanges illustrated in FIG. 16 have a first portion 70 and a second portion of reduced height 71. The reduced height portion 71 is adjacent the edge of the upper wall 20 and is reduced to substantially approximate the height of the latticees 24. The lattices are illustrated in FIG. 17 which is a cross-section along the line 17—17 in FIG. 1. The reduced height portion 71 and the lattices 24 are adapted to accept and support on edge protecting member. With the edges protected, the poultry coop of the present invention may be secured, as by a chain, without damage to the edge. An example of an appropriate edge protecting member is the "angle" 73 illustrated in FIG. 18. In edge protecting position, a leg 74 of angle 73 sits atop and is supported by the reduced height portion 71 and that portion of the lattices 24 adjacent the upper wall edge. A second leg 75 of the angle 73 extends down the side or marginal wall of the upper section. A plurality of pins 73 extend from the the underside of leg 74 for engagement with apertures 77 (see FIGS. 1 and 16) to hold the edge protecting angle in position. Alternatively, the angle, or other edge protecting member, may be permanently secured to the edge. Of course, no matter what attachment system is employed each of the four edges may be provided with a protecting member.

Referring now to FIG. 2, there is shown the main or lower wall 29 of the lower section. The lower wall section 29 is complementary to the upper wall 20 and is generally polygonal, rectangular in FIG. 2, with rounded corners 30. The lower wall 29 is flexible having a thin, generally uniform cross-section and is provided with grid forming openings 31. Around the periphery of the lower wall 29, there is positioned a plurality of downwardly extending ribs 32 which form closed figures with themselves or the edges of the lower wall 29. The use of the term downwardly extending is intended to mean that the ribs 32 extend away from the poultry coop, that direction being down when the lower wall 29 is in its usual relation to the upper wall 20. The rib closed figures are positioned around the lower wall to engage the flange closed figures of the upper wall and are configured to nest with the flange closed figures when the upper and lower sections of different poultry coops are in stacking relation to each other. Also, the rib closed figures are spaced from each other to accept a supporting structure between themselves and to prevent horizontal motion between the poultry coop and supporting structure. The supporting structure may be spaced planks, a pallet or other similar structure. The openings 31 and ribs 32 in the lower wall 29 are further illustrated in FIG. 7 which is a cross-section along the line 7—7 in FIG. 2.

As stated above, the poultry coop of the present invention consists in major part of an upper section and a lower section. Each of these sections consist of a main wall which is upper wall 20 for the upper section and lower wall 29 for the lower section, and marginal or side walls which extend from their main walls along their periphery generally at right angles. The marginal walls for each section are generally identical and one is illustrated in FIG. 8 along with a main wall 35 which is shown as lower wall 29 but may be either of the upper or lower walls 20–29. As illustrated in FIG. 8, the marginal wall consists of a plurality of spaced pillars 36 around the periphery of the main wall 35. Generally at each corner of the main wall 35 there is positioned a pillar 37. The space between the pillars 36 is open for ventilation while the space between the pillar 37 and the immediately adjacent pillars 36 is closed. In this way, adequate ventilation is maintained for the poultry within the poultry coop while the strength of the poultry coop is enhanced by the closed space between the pillar 37 and those adjacent to it. In essence, the closed space contiguous to the pillar 37 acts as a column at the corners of the poultry coop.

Each of the pillars 36 and 37 terminate at a rim 38 through which a plurality of apertures 39 extend. When an upper and lower section are positioned with their respective rims 38 together, they may be connected through opposing apertures such as that illustrated at 39. For example, a bolt extending through the aperture 39 of the upper section and the aperture 39 of the lower section may be employed to hold the upper and lower section together as by a nut. Of course, any other known means of fastening contiguous rims may be employed with or without the utilization of the apertures 39.

Referring again to FIG. 1, the central aperture 21 of the upper section upper wall 20 is intended to be covered with a door. A preferred embodiment of such a door is illustrated in a bottom view at 40 in FIG. 9. The door 40 has an inner perimeter 41 which generally corresponds to the size and shape of the central opening 21. A lip 42 extends from the inner perimeter 41 and is intended to overlie the radius 26 surrounding the central opening 21. A plurality of flanges (not shown) form closed figures with themselves or the perimeter 41 of the door 40 in a manner similar to that of the flanges 22 of the upper wall 20. Similarly, lattices 44 close the otherwise open central portion of the closed figures formed by the door flanges to allow ventilation while preventing poultry egress. Extending from the door 40 are hinge members 45 and 46. Each of the members 45 and 46 are provided with an elongated bore 47 (see FIG. 10) whose function will be more fully described below. On the opposite end of hinge members 45 and 46, the door 40 is provided with a handle 48 for raising and lowering the door 40. Extending from the same opposing end of the door 40 are members 49 which are spaced from the lip 42 to engage the underside of the radius 26 and provide a positive closure of the door.

Referring again to FIG. 1, there is shown the remainder of the hinge mechanism. The lip 26 is provided with two interruptions 50 and 51 which accept the hinge members 46 and 45, respectively. The interruptions 50 and 51 are provided with a curved portion 58 (see FIG. 4) which allows for a pivotal motion of the members 45 and 46. Intermediate and adjacent to the interruptions 50 and 51 are three bosses 52–54. The bosses 52–54 provide an upper guide for a pin 55 (shown in FIGS. 4–6 only) with the main surface of the upper wall 20 itself providing the lower guide.

With the door 40 in position and covering the central opening 21 of the upper wall 20, the hinge members 45 and 46 will lie within the radius interruptions 50 and 51 with their bores 47 in alignment to receive a pin 55 extending through the bosses 52–54. Because of the configuration of bores 47 and with a proper allowance in the size of the inner perimeter 41, the door 40 may be slid perpendicularly to the axis of the pin 55 such that the member 49 will engage and disengage the lower portion of the radius 26 providing a positive closure of the door 40 when engaged and allowing a pivotal movement of the door into an open position when not engaged.

Referring now to FIG. 12 there is shown a bottom view of a second preferred door embodiment 56 to cover the central opening 21 in the upper wall 20. In FIG. 12, like reference numerals indicate elements which function similarly to those shown in FIG. 9. In the embodiment of FIG. 12 the hinge members 45 and 46 are provided with a generally circular bore 57, bore 57 being configured to accept the pin 55. On the opposite end of the door 56 from the hinge members 45 and 46 is a spring loaded latch 60. The latch 60 is generally U-shaped (see FIG. 19) having extending portions 61 and 62 and a handle member 64. The handle 64 spans an open portion in the door 56 and extends into channels 63 within the door (see FIG. 15). The extending portions 61 and 62 also lie within the channels 63 and are slideable with the handle 64 along a guide 86 within the channels. The extending portions 61 and 62 have a catch 65 spaced from the lip 42 which is adapted to engage the underside of the radius 26. The lower wall forming the channel 63 is recessed to allow the catch 65 to be withdrawn enough to disengage the radius 26. The lower channel wall is also slotted at 80 to cooperate with a pin 81 (one shown) on the extending portions 61 and 62 to provide stops on the movement of the latch 60. Two springs 82 (one shown) resiliently urge the latch 60 into a position where the catches 65 will engage the radius 26 to provide a positive closure of the door while allowing its withdrawal from engagement so that the door may be pivoted about the pin 55. A camming surface 66 on the catch 65 will cause the latch to withdraw against its spring biasing upon contact with the radius 26 until the upper surface of the catch 65 has cleared the radius, in known manner.

With a poultry coop assembled from upper and lower sections and one of the preferred door embodiments described above, there is provided an efficient coop for the gathering, transportation and temporary storage of poultry. It has been found convenient to produce poultry coops of a size which will accommodate approximately twelve chickens. Of course, for a given size the number of chickens or other poultry which may be placed within the coop is dependent upon such things as temperature, humidity, etc. With those factors taken into consideration, a poultry coop built in accordance with the present invention will provide a system which significantly reduces the incidence of breast blisters and bruising, particularly during the transportation of poultry from one location to another. This is accomplished primarily through the provision of a poultry coop having a flexible floor (lower wall). The present invention also provides means by which two or more poultry coops may be placed within stacking relation without destroying the inherent flexibility of the lower wall. This is accomplished through the flange formed closed figures of the upper wall and the rib formed closed figures of the lower wall which are positioned and configured to nest with each other. The nesting of the upper and lower wall closed figures act to limit horizontal movement between one stacked coop and another and their placement around the periphery of the upper and lower walls does not defeat the flexing of the lower wall, at least in its central portion. While maintaining lower wall flexibility, the flange and rib closed figures also spread the force imposed on the lower coops during stacking through sufficient area to minimize breakage. This coupled with the column-like construction accomplished through closing the space between the corner pillars and the immediately adjacent pillars allows a stacking of the poultry coops of the present invention to a greater height without breakage. Also, by providing the column-like structures at the corners, a poultry coop built according to the present invention is able to provide greater ventilation within its marginal walls through the reduced support requirement within its marginal wall pillars. In the embodiment shown, this takes the form of a greater spacing between pillars than that shown by the prior art.

Along with its enhanced strength in stacking and increased ventilation, the present invention also provides a poultry coop which may be easily cleaned. This is accomplished particularly through the construction of the lower wall whose internal surface has no ribs, corrugations, or other protuberances. Of course, the greater size of the ventilation openings also provides larger openings through which cleaning sprays, etc. may be directed thus, also enhancing the cleanability of the present invention. Also, the molded hinge bosses within the upper wall of the present invention greatly ameliorate the hinge breakage problem attending all known prior art devices.

Many modifications and variations of the illustrated preferred embodiments are possible in light of the above teachings. For example, drain holes such as that illustrated at 85 may be provided within the upper wall and door to facilitate fluid runoff. It is therefore to be understood that, within the scope of the appended claims, the invention may be practiced otherwise than as specifically described.

What is claimed is:

1. A stackable poultry coop which comprises:
   complimentary upper and lower sections having an upper and lower wall, respectively, and marginal side walls extending generally at right angles from the periphery of each of said upper and lower walls and terminating at means for attaching their termini to each other, said upper wall having a central opening;
   a plurality of reinforcing flanges extending upwardly from said upper wall, each of said flanges being spaced from the others of said flanges and forming a closed figure with itself or the edges of said upper wall with said flange formed closed figures generally surrounding said central opening thereby distributing the force imposed on said upper wall during stacking, said flange formed closed figures having open centers and lattice means within said open centers for preventing poultry egress while providing ventilation and cleaning access with at least some of the flanges, including some of the flanges forming closed figures with the edge of said upper wall, having reduced height portions adjacent said edge;

a plurality of rib means extending downwardly from said lower wall, each of said rib means being spaced from the others of said rib means and forming a closed figure with itself or the edges of said lower wall for nesting engagement with a flange formed closed figure of said upper wall when in stacking relation thereto, said lower wall being formed of a flexible material of generally uniform cross-section having a plurality of grid forming apertures and said rib means closed figures being positioned around the periphery of said lower wall to allow at least its central portion to flex;

said upper and lower section marginal walls being formed by a plurality of spaced pillars, said upper and lower walls being generally polygonal with one of said pillars being positioned generally at each corner of said upper and lower walls and the interstices between said corner pillars and the immediately adjacent pillars being closed;

means for providing positive closure of said upper wall central opening including door means hingedly connected to said upper wall by boss means molded into said upper wall; and means overlying said reduced height flange portions and said edge for protecting said edge during securement of said poultry coop.

2. The poultry coop of claim 1 wherein said flange formed closed figures generally surround said central opening thereby distributing the force imposed on said upper wall during stacking.

3. The poultry coop of claim 1 wherein the closed figures on the lower wall are spaced sufficiently from each other for engaging a supporting structure within said spaces and preventing horizontal movement between the supporting structure and the poultry coop.

* * * * *